United States Patent [19]
Green

[11] Patent Number: 5,485,637
[45] Date of Patent: Jan. 23, 1996

[54] HOLDING TANK FOR WASTE

[76] Inventor: John A. Green, 6895 S. 825 East, Midvale, Utah 84047

[21] Appl. No.: 272,029

[22] Filed: Jul. 8, 1994

[51] Int. Cl.$^6$ .................................................. A47K 11/04
[52] U.S. Cl. .......................... 4/483; 4/485; 134/166 R; 134/183; 220/356
[58] Field of Search ............................ 4/321, 479, 483, 4/476, 485, 486; 220/323, 356; 134/166 R, 169 R, 183

[56] References Cited

U.S. PATENT DOCUMENTS

| | | | |
|---|---|---|---|
| 56,870 | 7/1866 | Alvord | 4/483 X |
| 81,345 | 8/1868 | Cook | 220/323 |
| 239,191 | 3/1881 | Ransom | 220/323 |
| 932,910 | 8/1909 | Shaw | 4/483 |
| 1,620,654 | 3/1927 | Haugen | 134/169 R |
| 2,604,226 | 7/1952 | Cramer | 220/356 |
| 2,606,708 | 8/1952 | Irvan | 220/356 |
| 2,941,562 | 6/1960 | Ripin | 220/356 X |
| 3,352,447 | 11/1967 | Hahn | 220/323 |

FOREIGN PATENT DOCUMENTS

| | | | |
|---|---|---|---|
| 0583970 | 1/1925 | France | 220/356 |
| 0162796 | 9/1905 | Germany | 4/479 |
| 0009946 | of 1910 | United Kingdom | 4/483 |
| 0814149 | 5/1959 | United Kingdom | 4/476 |

Primary Examiner—Robert M. Fetsuga
Attorney, Agent, or Firm—Berne S. Broadbent; A. John Pate

[57] ABSTRACT

A tank for liquidous material is disclosed having a single aperture for accessing an interior volume. A collar formed as a truncated cone circumscribes the aperture to provide sealing with a cap having a mating conical band. A band surface and a collar surface form the only contact between the cap and the collar. A drain fitting may be secured to the collar upon removal of the cap, after which the tank is upended for draining through the drain fitting. A wash fitting attached to the drain fitting sprays the interior of the tank for cleaning. No recesses (grooves) or 'O' ring seals, and no protruding, resilient, normal, face seals are used which might trap debris and inhibit complete cleaning. The tapered collar and band create contact forces for sealing that are much greater than the load securing the cap to the collar. The tank, collar and cap may be rotomolded of a single material in a single mold, the cap being severed and trimmed after molding. The tank is suitable for a holding tank of a portable toilet, and supports a removable seat. The tank is resistant to puncture for a "kick bucket" or "sharps" container for hospitals, and may be easily cleaned or sterilized.

17 Claims, 7 Drawing Sheets

HOLDING TANK FOR WASTE

BACKGROUND OF THE INVENTION

1. Field of the Invention

The invention relates to waste containers and more particularly to sealable holding tanks for portable toilets, hospital "sharps" containers and operating room "kick buckets."

2. State of the Art

Holding tanks constitute a principal component of portable toilets of the type installed in recreational vehicles or in free-standing shelters. Holding tanks are typically emptied by pumping or gravity induced draining. Tanks which are emptied by pumping are commonly open to the environment having no liquid-proof seal, containment being effected only by the wall of the tank. Such an open tank thus relies on remaining upright to prevent spills. A pumped tank must be emptied by a hose drawing the tank's contents into a tank truck for hauling to a disposal site. Alternatively, the tank may be taken to a disposal site for pumping directly into a receptacle or sewage line.

Drainable tanks are found in recreational vehicles including motor homes and boats. A drain penetrating a wall of the tank is positioned to empty from the lowest point in the tank through an attachable hose into a receptacle at a dumping station. A closure selected from one of several available designs, selectively opens and closes the drain. Closures typically involve gate valves, ball valves, blade valves, flapper valves or the like. These closures must be sealed by 'O' rings, face seals or the like. Each seal has a compressible, resilient member (the seal) having a surface contacting a corresponding surface of a harder, structural member (the gate or valve element). Face seals rely on direct pressure of the face seal against a corresponding surface, while 'O' rings rely on resilient rings protruding slightly to contact a surface from retaining grooves into which the 'O' rings are inserted.

In closures, the resilient seals eventually break, wear, age, cut, rot, deform, relax or otherwise fail to seal. Moreover, the closures tend to be mechanically complex or intricate, subjecting themselves to breakage, warpage, or other mechanical failures of costly parts that are not easily replaced. Also, closures not only trap debris in crevices, grooves, gaps and slots, they tend to prevent access for easy cleaning of a holding tank. Tanks may be substantially emptied but not cleaned.

Portable holding tanks with their large size, connections and fixtures are not, in reality, easily portable, nor are they sealed to tolerate being tipped, or turned upside down (upended). These last considerations are important in back country travel such as river rafting, wilderness hiking and the like where human impact must be minimized. In some areas, virtually all solid waste must be contained and carried out by travelers or maintenance workers.

Another type of holding tank is a hospital "kick bucket" that comes in a variety of configurations for receiving wastes, typically those generated in an operating room. Likewise, a "sharps" container must be puncture proof, sealable, and durable, yet easily accessible for receiving and holding needles, scalpels, glass and other sharp objects for later disposal or recycling.

A sealable containment vessel capable of performing these functions is desirable.

SUMMARY

The apparatus has a mated cap and collar, each having one of a mated pair of tapered surfaces, to seal a tank having a single aperture. The cap and collar are held together with an axial load while making contact along the angled or tapered surface. The slope of the tapered (angled) surface produces a leveraged or wedging action resulting in high contact pressure between the cap and collar. The seal material may be identical to the body of the tank and cap and may be molded integrally therewith. The circular configuration of the conical surfaces distributes forces and assures a uniform and complete seal. The seal is liquid proof, without the need for an additional resilient member such as an 'O' ring or face seal.

The apparatus may be embodied as a tank having walls for containing a liquid and provided with an aperture for accessing an interior volume. A collar secured by a first edge to one wall circumscribes the aperture. The collar extends along a collar surface a length in an axial direction and a span in a radial direction, terminating at a second edge or free edge. The slope is equal to the ratio of the axial length of the collar to the radial span.

A cap comprises a band circumscribing a bulkhead typically circular, rectangular or oval in shape. The band has a band surface formed to removably fit against the collar surface to seal the aperture against passage of liquids. The band contacts the collar only on the collar surface. No stops or shoulders are relied upon to register the cap axially with the collar, as is done with most caps. Unlike other container caps, the cap need not rely on separate, resilient face seals or any form of 'O' ring, although it may.

The cap is maintained in position by a load, a force, rather than by a fixed retainer, friction fit, snap ring or the like at a fixed position. In this way, the seal will remain effective to contain liquids over a broad range of temperatures and conditions. The collar and cap are preferably configured to equalize hoop stresses around a circumference of the band and collar.

The tank may have a draining fixture for emptying the tank out through the aperture. The tank may be made to have only a single aperture through which it is both filled and emptied. The draining fixture may seal against the collar in the same manner as does the cap.

The tank is tipped upside down (upended) to drain. A washing fixture is attached to the draining fixture to spray the interior of the tank, the sprayed liquid used to wash the interior drains out just as the other contents of the tank.

The tank may be provided with fasteners for selectively securing the cap and the draining fixture to the collar. One fastener has a lever and latch. The latch has a rod pivotably connected at one end to a lever, between a handle and a fulcrum of the lever. The other end of the rod is connected to a keeper for engaging the draining fixture with the tank. Upon rotation of the handle of the lever about the fulcrum, the lever draws the latch tight, then breaks over the center of the fulcrum. The lever is held in place by the tension from the latch through the rod into the lever.

The tank may have handles connected thereto for carrying and for upending the tank. A fastener for the cap may be a member for maintaining an axial load. The fastener may be a bowed plate having ears on each end to engage the handles on the tank. Spring-loaded latches at one end of the plate may allow selective release of the ear from the handle at that end. The middle of the plate bows slightly over the cap, maintaining a force on the cap to keep it in place and sealed.

The tank may be a holding tank of a portable toilet provided with a seat and lid selectively attachable to the tank for use in this configuration. The seat is configured to support a user, and may be removably connected to the handles of the tank similar in a manner to attachment of the bowed plate, a plate being constructed to support the seat rather than to hold the cap.

The tank may be made of the same material as the collar. The tank and collar may be made in a single mold. Likewise the cap may be formed of the same material, and may be manufactured in the same mold to be separated by cutting later. Rotomolding, sometimes called tumble molding, has been found to be a suitable molding process and produces a satisfactory wall thickness at all points, particularly at corners. The walls of the tank, so formed of a selected thickness of polyethylene material, may be made highly resistant to puncture and to chemical attack. Other materials such as polysulfone, polypropylene and others may be selected to be dimensionally stable in an autoclave or hot liquid scrub when recycled for medical applications.

The tank is formed to expose all debris on an interior surface thereof to the washing action of a spray wash. Other sealing systems have crevices, grooves and the like that are very difficult to clean. By contrast, the tank may be made to have a wall or walls formed to be continuous, the aperture providing the only opening or access to the interior volume.

The seal is formed to contain a liquid.

A method is disclosed for containing a liquid which may otherwise leak from a container. The method includes placing a material into a tank having a single aperture, the aperture being circumscribed by a collar secured at one edge to a wall of the tank and extending away at an angle with respect to the wall to a second free edge. A collar surface slopes extending between the one edge and the free edge mates with a band surface formed on a band of the cap. Sealing is effected by positioning the cap in sealing relation to the collar over the aperture and applying a load to the cap. The sealing forces between the mating surfaces (collar surface and band surface) are multiplied over the loading forces according to the slope of the collar surface and band surface.

Emptying is accomplished by removing the cap from the collar, then upending the tank. The liquidous material is discharged through the aperture. The method may include connecting a draining fixture to the collar in sealing relation for conducting the liquidous material to a receptacle. The method may also include introducing a spray into the tank while in an upended position and permitting the spray to drain out.

BRIEF DESCRIPTION OF THE DRAWINGS

FIG. 5 is a front elevation view of an alternate embodiment of the apparatus of the invention suitable for use as a waste drum, sharps container, kick-bucket or the like.

FIG. 6 is a front elevation view of an alternate embodiment of the invention suitable for use as a waste collection drum, sharps container, kick-bucket or the like.

DETAILED DESCRIPTION OF THE ILLUSTRATED EMBODIMENT

As best understood by reference to FIGS. 1–8, an apparatus serving as a containment system or holding tank 10 is comprised of a vessel or tank 12 having supports serving as handle assemblies 14A, 14B secured thereto. A cap 16 is formed to be secured to the tank 12 by a retainer or bracket 18 during storage or transport. A seat assembly 20 may replace the retainer 18 and cap 16 for use as a portable toilet.

For emptying the tank 12, a drain assembly 22 is connected to the tank 12 in place of the cap 16, being secured by latch assemblies 24A, 24B on the drain assembly 22 connecting to the handle assemblies 14A, 14B, respectively. A spray assembly 26 may be attached to the drain assembly 22 for washing out the tank 12. The wash water or other cleaner (e.g. disinfectant, steam, solvent) sprayed into the tank 12 by the spray assembly 26 drains out through the drain assembly 22.

Figure 5:
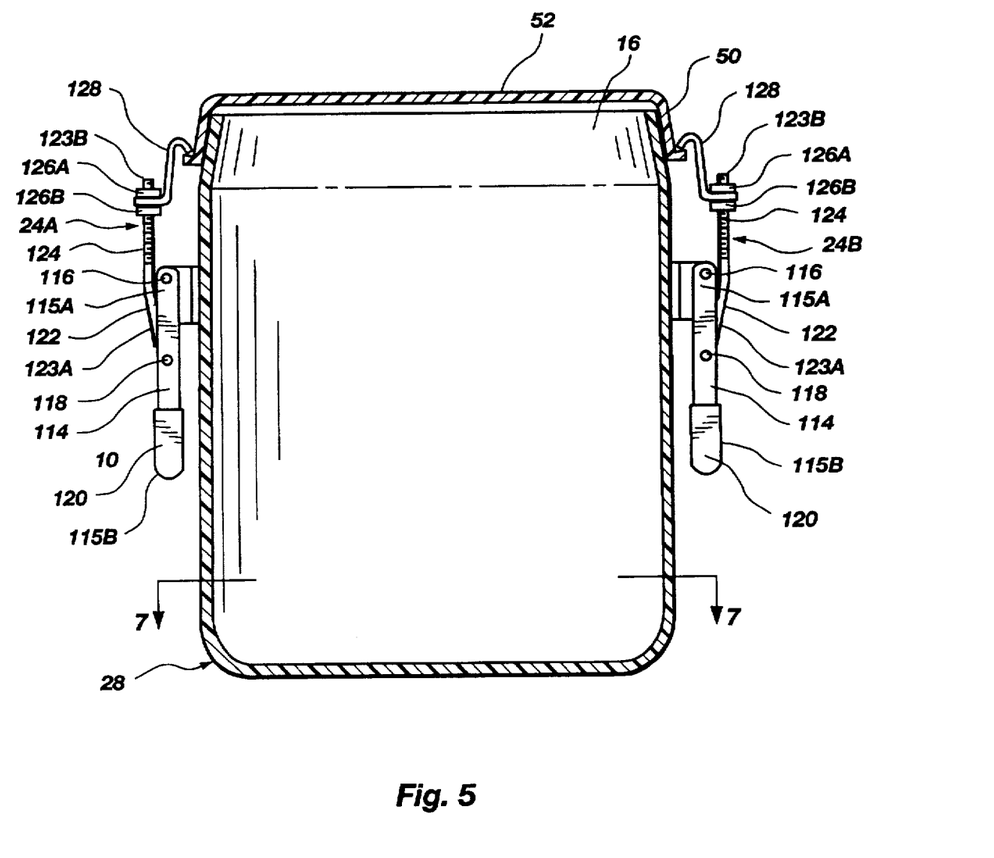
Figure 6:
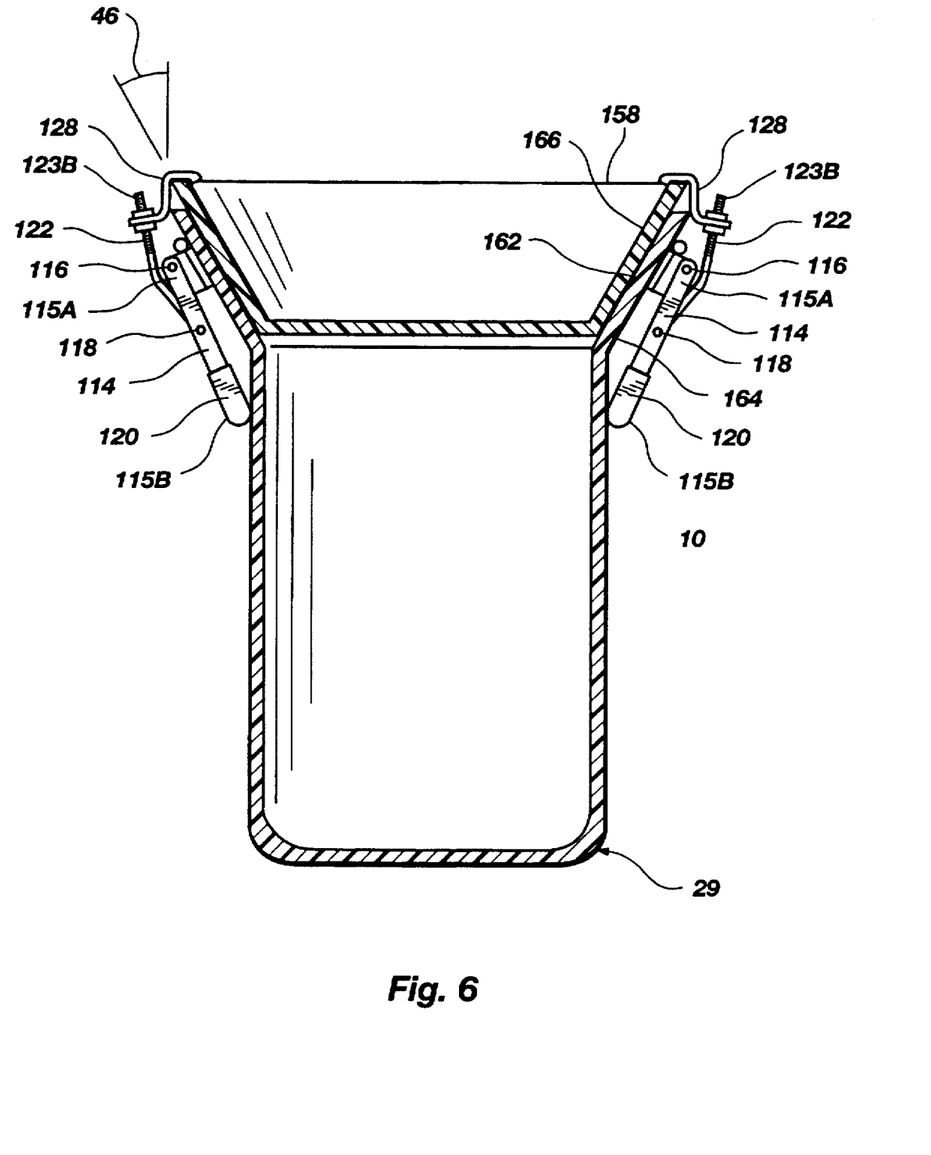
Figure 7:
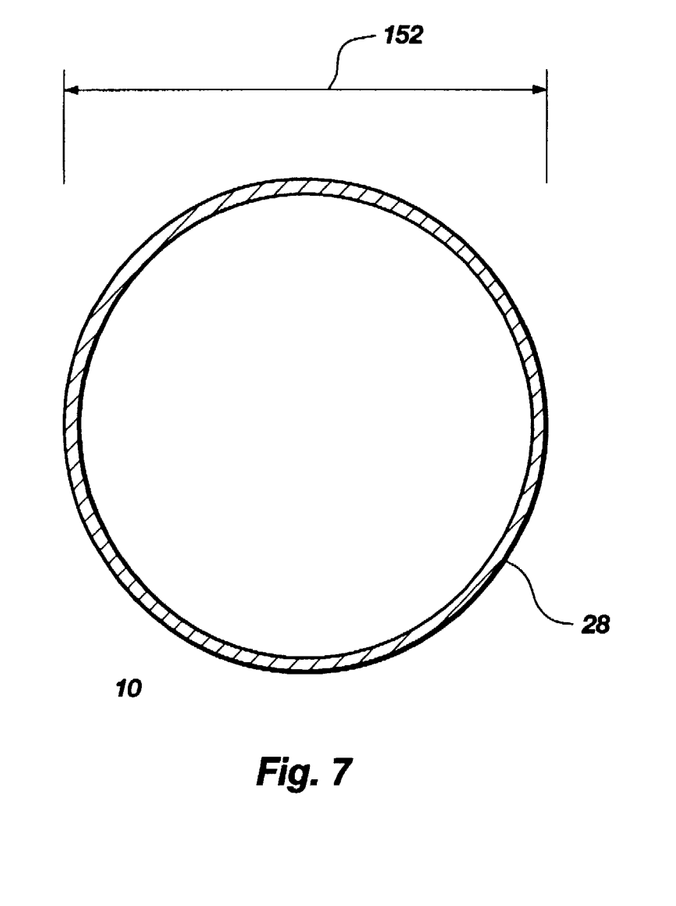
FIG. 7 is a cross-sectional, top plan view of the apparatus of FIGS. 1–4.
Figure 8:
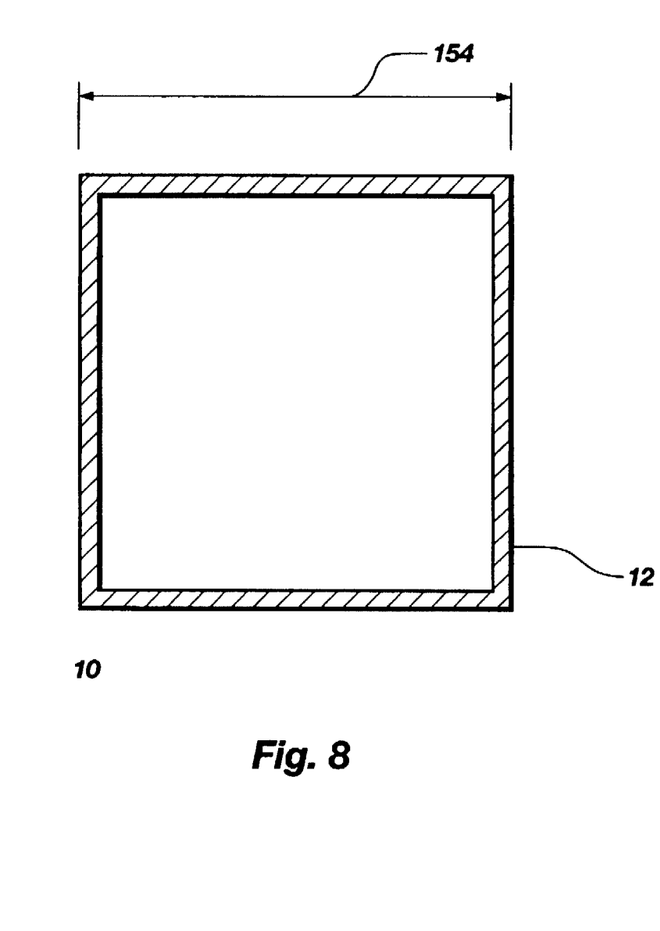
FIG. 8 is a cross-sectional, top plan view of an alternate embodiment of the apparatus of FIGS. 1–4.

The tanks 28, 29 of FIGS. 5 and 6 are additional embodiments to replace the tank 12 in the apparatus of the invention. The tanks 28, 29 are particularly suited for applications such as hospital sharps containers and kick buckets. The tank 12 may be formed to have a circular cross section or a rectangular cross section. As seen in FIGS. 7 and 8, all tanks 12, 28, 29 may be configured in either a circular or rectangular cross section. Each shape may have advantages such as storage, stability or capacity in specific applications.

Structure

Referring to FIGS. 1–4, the tank 12 is formed to have walls 30A–30F assembled in rectilinear arrangement. The wall 30A is provided with an aperture 32 of diameter 33 for receiving and discharging the contents of the tank 12. A collar 34 is formed to surround the aperture 32, and may be formed integrally with the tank 12 and particularly with the wall 30A. Recesses 36A–36D are formed in the tank 12 to receive the handle assemblies 14A, 14B which are thereby relieved so as not to extend beyond the walls 30B–30E.

The walls 30A–30F and the tank 12 may be defined by the length 38A, width 3O 38B and height 38C. The collar 34 may have a tapered, rectangular shape or a tapered, circular (conical) shape, defined by top and bottom inside diameters 40A, 40B, and top and bottom outside diameters 42A, 42B, respectively. The collar 34 extends a height 44 away from the wall 30A, the collar surface 45 making an angle 46 with an axis 47 of the collar 34 of between approximately 5 and 60 degrees, and preferably 30 degrees or less.

A wall thickness 48A is selected to give the collar 34 sufficient strength and stiffness to support the cap 16 without buckling when loaded by the retainer 18. The wall thickness is between approximately 0.1 and 1.0 inches, and 0.25 inches is satisfactory for an aperture 32 having a diameter 33 of approximately 9 inches.

Figure 2:
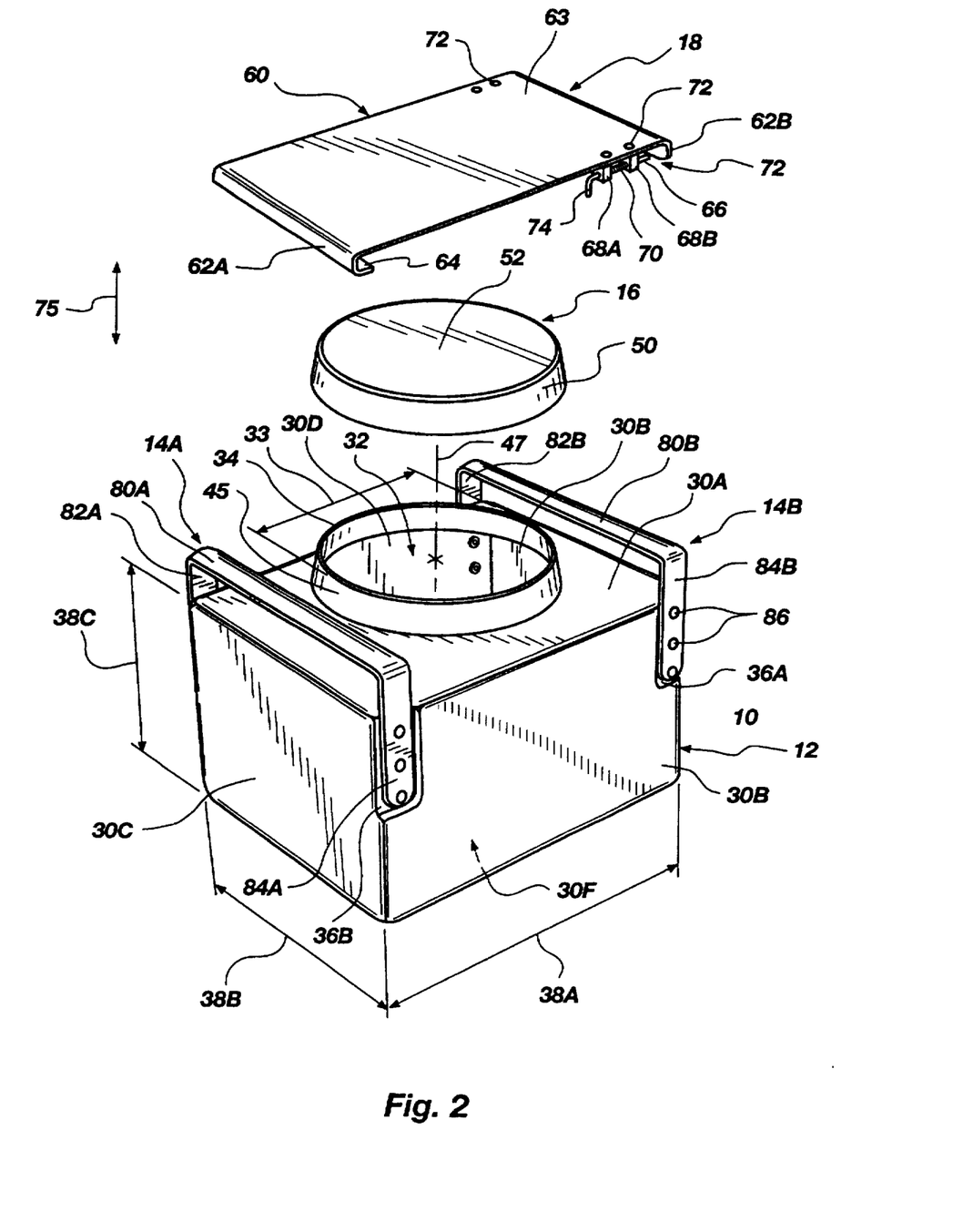
FIG. 2 is an isometric, partially-exploded, front quarter view of the apparatus of the invention.
Figure 3:
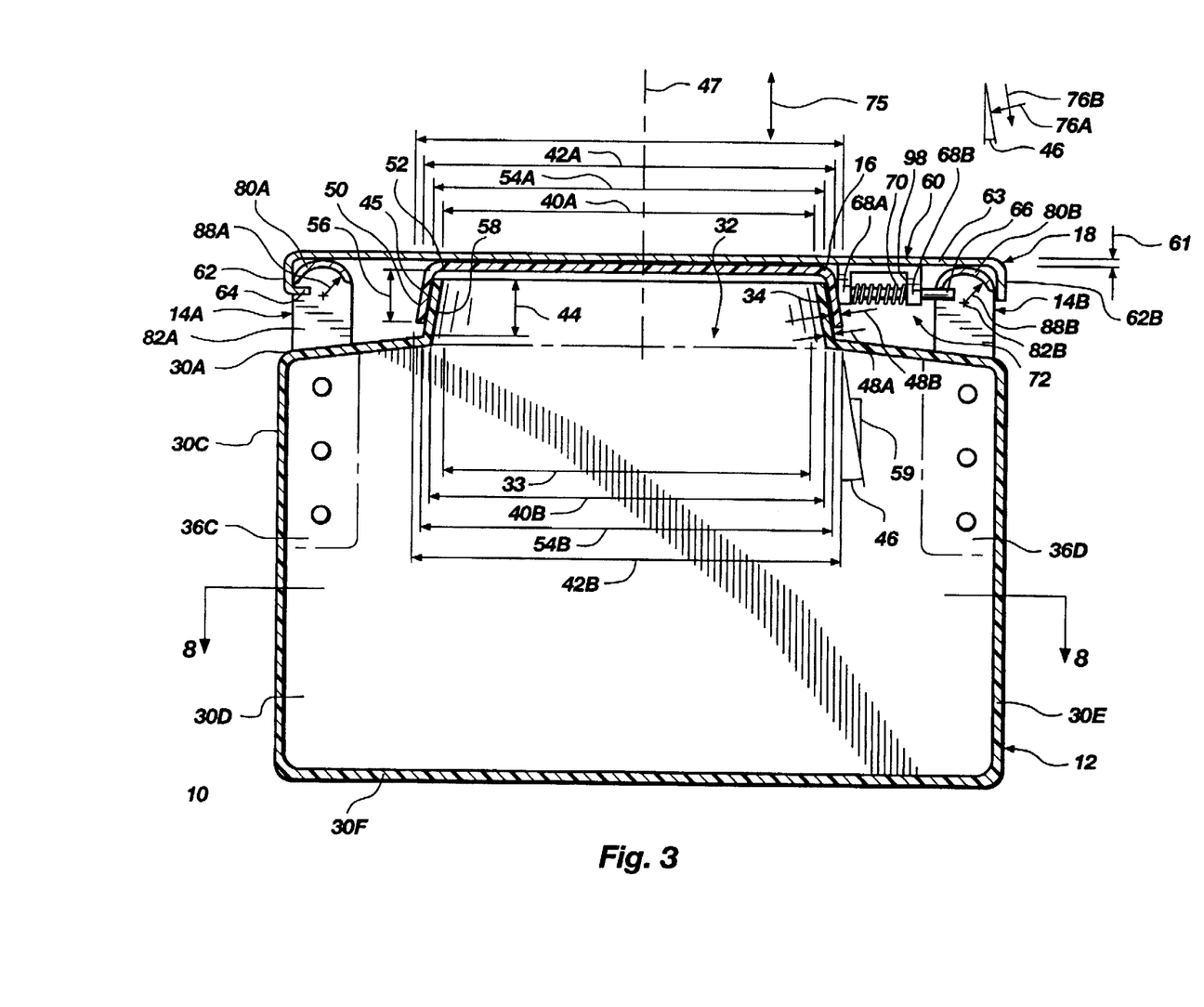
FIG. 3. is a cross-sectional, front elevation view of the apparatus of FIG. 1.

The cap 16 of FIGS. 2 and 3 has a wall thickness 48B along the band 50. The band 50 is formed to matingly fit against the collar 34. The bulkhead 52, which may be integrally formed as part of the band 50, does not contact the collar 34. The inside diameters 54A, 54B and height 56 of the band 50 of the cap 16 are selected to assure that contact between the band surface 58 inside the cap 16 and the collar surface 45 is the only contact between the cap 16 and the collar 34.

Similarly, except for a load applied by the retainer 18, the cap has no other connection to the tank. The tapered, mating fit of the collar surface 45 and band surface 58 creates a wedging or leveraging action, increasing the contact pressure between the cap 16 and the collar 34 according to the slope 59 (ratio of the height 44 to half the difference between the diameters 42A and 42B) of the angle 46.

In FIGS. 2 and 3, the retainer 18 has a flex member 60 having sufficient stiffness to resist deflection, but a sufficiently high elastic deflection prior to yielding to deflect a distance 61 of potential movement of the cap 16. The flex member 60 could employ any one of several mechanisms configured to deflect under load, or to load upon deflection, including the latch assembly 24A or a spring-loaded equivalent.

In the preferred embodiment, guides 62A, 62B, formed on a plate 63, fit over the handle assemblies 14A, 14B, respectively. The guide 62A is formed to have a lip 64 that catches under the handle assembly 14A. Pins 66 slidably retained in the blocks 68A, 68B secured to the plate 63, move back against springs 70 to form fasteners 72 actuated by a user drawing back the pull or handle 74.

Thus, the flex member 60 acts to load the cap 16 in an axial direction 75, maintaining a large contact force 76A between and normal to the collar surface 45 and the band surface 58. The contact force 76B is supported by the hoop stresses in the collar 34 and the band 50. The wall thicknesses 48A, 48B are selected to limit deflections and distortions in the collar 34 and band 50, supporting the required hoop stresses for sealing.

Figure 1:
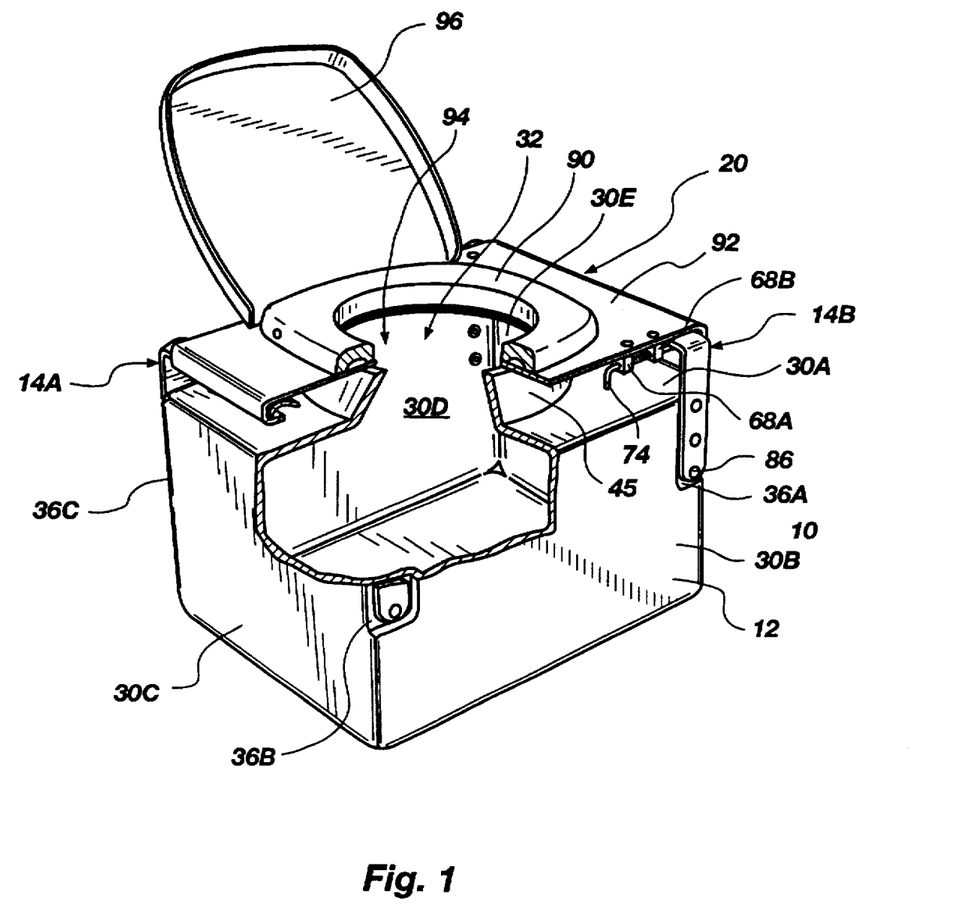
FIG. 1 is a partially isometric cut-away front quarter view of the apparatus of the invention arranged with a seat and lid attached.

In FIGS. 1–3, the handle assemblies 14A, 14B are virtually identical, being configured and installed on the tank 12 as mirror images of one another. The handle assemblies 14A, 14B have handle portions 80A, 80B, respectively, extending to terminate in tabs 82A, 84A and 82B, 84B, respectively. A plurality of fasteners 86 secure the tabs 82A, 82B, 84A, 84B to the tank 12 in the recesses 36A, 36B, 36C, 36D. Each handle portion 80A, 80B is curved about a radius 88A, 88B to increase the structural strength and stiffness of the handle portions 80A, 80B.

In FIG. 1, the seat assembly 20 includes a seat 90 attached to a support or bracket 92 resembling the plate 63 operably modified with an aperture 94. A lid 96 may be pivotably secured to the seat 90 or to the support 92 for convenience. The seat assembly 20 is attached to the tank 12, and removed, by operation of the pin 66, slidably retained in the blocks 68A, 68B secured to the support 63. The pin 66 moves against the spring 70 to form a fastener actuated by a user drawing back the pull or handle 74. A stop 98 secured to the pin 66 contacts the spring 70 and also serves to retain the pin 66 from moving too far forward through the block 68B.

Figure 4:
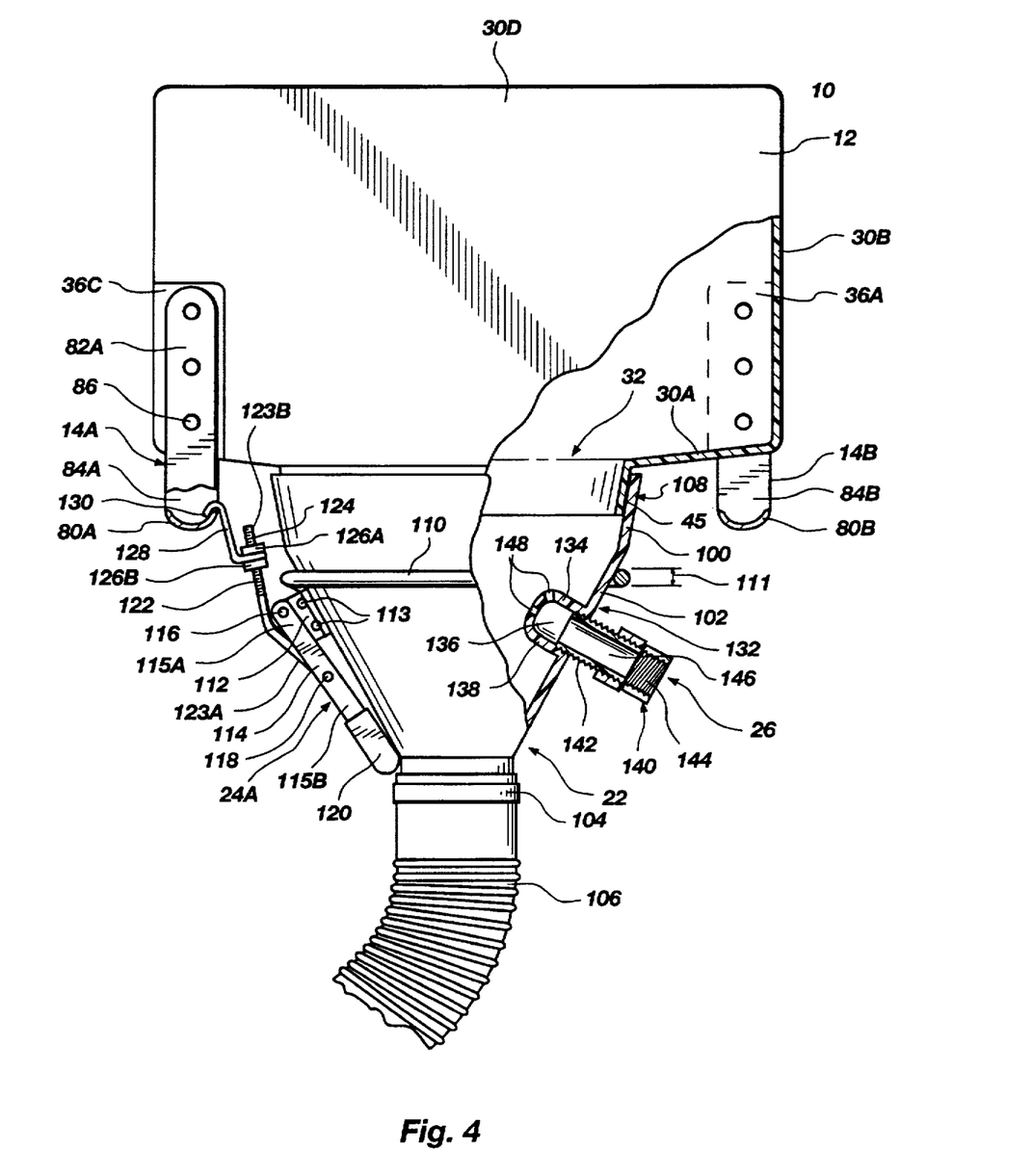
FIG. 4. is a front elevation view of the apparatus of FIG. 1 outfitted with washing and draining fixtures and upended for emptying and draining.

Referring to FIG. 4, a drain assembly 22 includes a seal portion 100 connected to, and preferably formed as part of, a funnel portion 102. With the cap 16 and seat assembly 20 removed from the tank 12, the funnel portion 102 is sealingly fastened by a connector 104 to the tubing 106 through which the tank 12 may be drained. A sealing surface 108 formed inside the seal portion 100 is sized to fit over the collar 34, sealing against the band surface 58 in a manner similar to the band 50 of the cap 16. The funnel portion 102, connector 104 and tubing 106 are all sealingly connected against leakage of liquid.

Secured to the drain assembly 22, a latch assembly 24 has a stress distributor 110 for resisting distortion of the drain assembly. The stress distributor 110 may be formed as a ring of steel having a circular cross section of diameter 111 from about one tenth inch to one inch, and preferably approximately three eighths of an inch. Other reinforcing materials of suitable strength and stiffness, including aluminum and polymer or glass fibers, may be used. Other cross sectional shapes including annuli, rectangles and the like, may be used to provide uniform stress on the funnel portion 102 or seal portion 100 of the drain assembly.

A lug 112 is secured to, or formed on, the stress distributor 110 by fasteners 113, which may include rivets, bolts, screws, and adhesive or cohesive bonding. A lever 114 is pivotably attached at one end 115A to the lug 112 by a pin or fulcrum 116. The lever 114 extends away from the fulcrum 116 to connect to a draw pivot 118, preferably positioned midway along the length of the lever 114 and pivotably attached thereto. A handle 120 is provided at the other end 115B of the lever 114. The relative positions of the draw pivot 118 and handle 120 with respect to the one end 115A determine the leverage advantage of the handle 120 on the rod 122. Multiple levers 114 may be attached around the stress distributor 110, but two levers 114 are preferred.

A rod 122 connects at one end 123A to the draw pivot 118 to move therewith. At the other end 123B, threads 124 are provided to secure a nut 126A and a locknut 126B to the rod 122 for holding a catch 128. Each catch 128 (of which there are preferably two) is formed to engage one of the handle portions 80A, 80B. A lip 130 formed by the radii 88A, 88B on the handle portions 80A, 80B retains the catch 128. Movement of the nut 126A along the threads 124 of the rod 122 adjusts the effective length of the rod 122 and the tension applied by the rod 122 to the stress distributor 110 to hold the drain assembly 22 against the collar 34 in a sealing fit.

With the drain assembly 22 in place over the collar 34, the end (not shown) of the tubing 106 is placed in a receiving receptacle (not shown). Then, the tank 12 is lifted by the handle assemblies 14A, 14B and turned upside down (upended). The contents of the tank 12 drain out through the funnel portion 102 and the tubing 106.

A spray assembly 26 directs water or other cleaning liquid inside the tank 12 during draining operations to effect complete cleaning. The spray assembly 26 includes a spray nozzle 132 that may be attached to or formed integrally with the funnel portion 102 of the drain assembly. Threads 134, preferably formed internally to a cavity 136 formed by the wall 138 of the spray assembly 26 are configured to receive an adapter 140.

Threads 142 on the adapter 140 matingly fit the threads 134 in a water-tight, sealing arrangement. Threads 144 formed internally in the adapter 140 are preferably sized to receive a standard fitting from a garden hose (not shown). Water may then be forced from the garden hose, through the passage 146 in the adapter 140, and through the cavity 136, to be sprayed into the tank 12 through the apertures 148 in the wall 138.

Operation

The tank 12 is prepared to be moved in the configuration of FIGS. 1–4, by removing the seat assembly 20 or drain assembly 22 from the tank 12 and placing the cap 16 on the collar 34, thereby sealing the aperture 32 against passage of liquids. The retainer 18 is positioned to cause the lip 64 to catch under one of the handle portions 80A, 80B. Then the retainer 18 is lowered, the pins 66 being drawn back and released to secure them under the remaining handle portion 80B, 80A. The plate 63 bows over the cap 16 to maintain a force in an axial direction 75 on the cap 16.

The tank is configured for use by removing from the tank 12 the retainer 18, removing the cap 16, and positioning the support 92 on the handle portions 80A, 80B in a manner similar to or identical to that for the retainer 18. The lid 96 is raised or lowered with respect to the seat 90 as appropriate during extended periods of use.

To configure the tank 12 to be emptied and cleaned, a user removes the cap 12, replacing the cap with the drain assembly 22, the seal portion 100 being positioned over the collar 34. The latch assembly 24 is preferably permanently secured to the drain assembly 22. Thus, the handle 120 on each lever 114 is grasped by a user and rotated about the fulcrum 116, moving the draw pivot 118, rod 122 and catch 128 toward the appropriate handle portion 80A, 80B. The catch 128 is positioned under the lip 130, and the handle 120 is rotated about the fulcrum 116, drawing the catch 128 tight against the lip 130. A hose (not shown) from a pressurized water source is connected to the adapter 140.

To drain the tank 12, a user places the end (not shown) of the tubing 106 into a receptacle (not shown) of a larger holding tank, sewage system or the like before lifting and turning upside down (upending) the tank 12. After a time sufficient for the contents to drain out, water is turned on in the hose attached to the adapter 140, forcing water through the apertures 148 in a spray directed inside the tank 12. The water continues to wash and drain the tank 12 as needed until cleaning is complete. Cleaning agents, disinfecting agents and the like may be introduced through the water supply to the hose if desired.

In alternate embodiments, the containment system 10 may be configured as illustrated in FIGS. 5–6. The latch assembly 24 may be secured to a tank 28 having a cap 16 secured to a collar 34 configured as described with respect to FIGS. 1–3. Other means for attachment and tensioning may be used for securing the cap 16 to the collar 34 of the tank 150, as appropriate for the use of the tank 28.

The maximum width, such as the diameter 152 of the tank 28 in FIG. 7, width 154 of the tank 12 in FIG. 8, or for other cross-sectional shapes alternate embodiments of the tanks 12, 28, 29 may be comparable to the diameter 54B of the cap 16. The tanks 12, 28, 29 may be placed in a rack (not shown) or rollers (not shown) to be easily accessible, stable, mobile and otherwise suitable for access, use and storage in a hospital or other health care environment. Opening and closing of the tanks 28, 29 is similar to that for the tank 12, and all washing and other cleaning operations preferably occur at a central station for recycling the tanks 12, 28, 29.

FIG. 6 illustrates an internal cap 158 on a tank 29 configured to receive the cap 158 against a collar surface 162 of a collar 164. The collar 164 is preferably formed integrally with the tank 160. The collar 164 preferably contacts the cap 158 only where the collar surface 162 contacts the band surface 166 to seal the tank 29. Thus the tanks 12, 28 and 29 all use the wedging or leveraging effect to seal the aperture 32.

The configuration of FIG. 6 creates a funnel-like effect for use as a "kick bucket" to received wastes in an operating room of a hospital. A bag of polyethylene or other plastic may be installed in the tank 29 as a liner to be folded into the tank 29 prior to closure by the cap 158, and to be removable with contained wastes.

The embodiments disclosed herein are by way of illustration only and not limitation. Obvious variations of the invention will be readily apparent to those of skill in the art. Wherefore the scope of the invention is limited only by the claims.

What is claimed is:

1. A portable toilet comprising:

a tank formed of a plurality of walls defining an interior and provided with an aperture formed in a wall of the plurality of walls for accessing the interior;

a collar secured at a first edge to the wall to surround the aperture, the collar tapering along a collar surface a length in an axial direction and a span in a radial direction to a second edge of the collar;

a seat selectively attachable to be supported by the tank and having an opening positionable to register with the aperture for supporting a user;

a cap comprising a band projecting from a bulkhead, the band having a band surface formed to sealingly fit against the collar surface for sealing the aperture against passage of liquids, the band being selectively positionable on the collar to be spaced from the tank to contact the collar only on the collar surface intermediate the top edge and the bottom edge;

a funnel sealably securable to the collar for draining the tank through the aperture; and a support attached to the tank and engaged by a latch mechanism for fastening selectively the seat, the cap and the funnel to the collar.

2. The portable toilet of claim 1 further comprising a nozzle connectable to penetrate the funnel for washing the interior.

3. The portable toilet of claim 1 wherein the support further comprises handles connected to the tank for carrying and upending the tank.

4. The portable toilet of claim 3 wherein the support is adapted for selectively, securably receiving a first bracket connected to the seat, and a second bracket for attaching the cap to the collar.

5. The portable toilet of claim 4 wherein the first bracket includes a plate extending across the tank for supporting the weight of a user on the seat, the plate having an opening registrable with the aperture, and the second bracket includes a plate contacting the cap for deflecting to provide a force urging the cap toward the tank.

6. The portable toilet of claim 1 wherein the tank and the collar are homogeneously formed in a single mold.

7. The portable toilet of claim 6 wherein the tank, collar and cap are homogeneously formed in a single mold.

8. The portable toilet of claim 1 wherein the tank is formed of a material resistant to puncture.

9. The portable toilet of claim 1 wherein the tank is formed of a material resistant to chemical attack.

10. The portable toilet of claim 1 wherein the tank is further comprised of a material selected to be dimensionally stable when heated above an ambient temperature.

11. The portable toilet of claim 1 wherein the tank further comprises a continuous interior surface extending away from the aperture.

12. The portable toilet of claim 1 wherein the tank is continuous, the aperture providing the only access to the interior.

13. A portable toilet comprising:

a tank formed of a plurality of walls defining an interior, a wall of the plurality of walls being positioned at a top end of the tank and being provided with an aperture for accessing the interior;

a collar having a first edge secured to the wall, and tapering to a second edge surrounding the aperture, the collar having a collar surface extending smoothly a length in an axial direction and a span in a radial direction between the first and second edges;

a support attached to the tank;

a seat for supporting a user, the seat being selectively attachable to be supported by the support and having an opening positionable to register with the aperture for use by a seated user;

a cap having a band portion tapering between a solid bulkhead and a free edge, the band portion formed to sealingly fit against the collar surface and to position the free edge away from the first edge for sealing the aperture against passage of liquids; and a bracket selectively attachable to the support to contact the cap, the bracket being deflectable for providing a force to urge the cap toward the tank.

14. A method of using a portable toilet for collecting, discharging, and containing liquidous waste, the method comprising:

positioning a tank on a support surface at a first location, the tank comprising a plurality of walls, a wall of the plurality of walls being positioned at a top end of the tank, a collar secured at a first edge to taper away from the wall to surround an the aperture in the wall, the collar having a collar surface extending smoothly therearound for receiving a cap selectively positionable on the collar surface in sealing relation at a position spaced away from the wall, and a seat selectively attachable to the tank to have an opening positionable to register with the aperture for use by a seated user;

attaching the seat to the tank to register the opening with the aperture by latching a support plate, connected to the seat, to a support secured to the tank;

placing waste in the tank through the aperture;

removing the seat from the tank;

sealing the tank by placing the a cap on the collar surface to imperviously close the aperture;

transporting the tank to a second location away from the first location;

opening the tank by removing the cap from the collar;

upending the tank; and discharging the waste through the aperture.

15. The method of claim 14 wherein upending further comprises, grasping the brackets and lifting the tank.

16. The method of claim 14 wherein discharging further includes attaching a funnel to the bracket to be sealingly positioned against the collar surface.

17. The method of claim 16 wherein discharging further includes running water through a nozzle passing through the funnel, washing the interior, and discharging the water through the aperture and the funnel.

* * * * *